June 3, 1969

A. NYMAN 3,448,209

STABILIZED AUTOMATIC MAPPER

Filed Feb. 19, 1947

INVENTOR.
ALEXANDER NYMAN
BY Wade Koonty
Chester Pieting
HIS ATTORNEYS

| United States Patent Office | 3,448,209 |
|---|---|
| | Patented June 3, 1969 |

3,448,209
STABILIZED AUTOMATIC MAPPER
Alexander Nyman, Box 14, Dover, Mass. 02030
Continuation-in-part of application Ser. No. 716,593,
Dec. 16, 1946. This application Feb. 19, 1947, Ser.
No. 729,644
Int. Cl. H04n *5/76;* G01n *21/22;* H01j *37/22*
U.S. Cl. 178—6.6                         6 Claims The invention described herein may be manufactured and used by or for the Government for governmental purposes without the payment to me of any royalty thereon.

This application is a continuation-in-part of my copending application Ser. No. 716,593 filed Dec. 16, 1946, for Automatic Mapping Device.

The present invention relates to an automatic mapper adapted to be used in an airplane to map the ground beneath the airplane. The mapping action is performed automatically. The apparatus is preferably made to map the terrain beneath the airplane based upon the heat-emissive characteristics of that terrain. It may, however, be made to map the visible appearance of the ground in ordinary light, or the ultra-violet emissivity of the ground instead of using the herein described infra-red responsive apparatus.

An outstanding characteristic of the present invention is the use of gyroscopic stabilization of the scanning head which provides an exceptionally uniform speed of scanning and freedom from disturbances caused by outside vibrations or other forces. Another characteristic is the manner in which the gyroscopic stabilizing system and the oscillating optical system are combined so that they will oscillate together, thus promoting compactness and freedom from undesired vibration.

One object of the present invention is to provide an automatic mapper which can be used in an airplane to map the ground over which the airplane passes.

Another object is to provide an automatic mapper which is easily converted to map terrain according to its appearance by visible light or by ultra-violet light as an alternative to mapping by infra-red light as disclosed herein.

Another object is to provide an apparatus of the character described which will map terrain without the use of inks.

Another object is to provide a stabilized scanning system for an automatic mapper.

Another object is to provide a scanning system for an automatic mapper in which the gyroscopic elements used for stabilization are made to perform the scanning function. In this system the forces and movements inherent in the gyroscopic structure are used to stabilize the scanning from a moving airplane.

Figure 1:
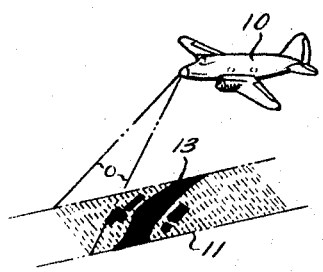
FIG. 1 is a perspective view of an airplane traversing a strip of terrain to be scanned. The angle O defines the limits of lateral travel of the scanning device located in the airplane.
Figure 3:
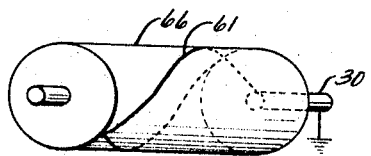
FIG. 3 is a perspective view of a non-conductive roll which bears a conductive helix. The roll is one of the parts of the recorder shown in FIG. 2.

In FIG. 1, an airplane 10, which bears the mapper of my invention in its nose is flying over a strip of terrain 11, which it is desired to map. The angle O defines the lateral limits to which a scanning head 12 (FIGS. 2–4) is adapted to oscillate to the right and left of the airplane's direction of flight. The terrain 11 shows a number of black area 13 which, for the sake of example, may be imagined to be heat sources, such as steel works or oil refineries. Both of such kinds of plants give out a great deal of heat. The black areas 13 are later reproduced on the product of the apparatus, a map-like presentation upon the strip 32, which may be of paper or other sheet material. Such a strip presentation has military value in that it may serve as a guide to heat emitting factories and the like when other bombing airplanes or guided missiles are sent to traverse the route followed by the mapping airplane. The black area 13 indicate by their position on the map and their distance from the starting point of the strip 32, just when the bombs should be released or the missile guided to the ground and detonated.

Figure 2:
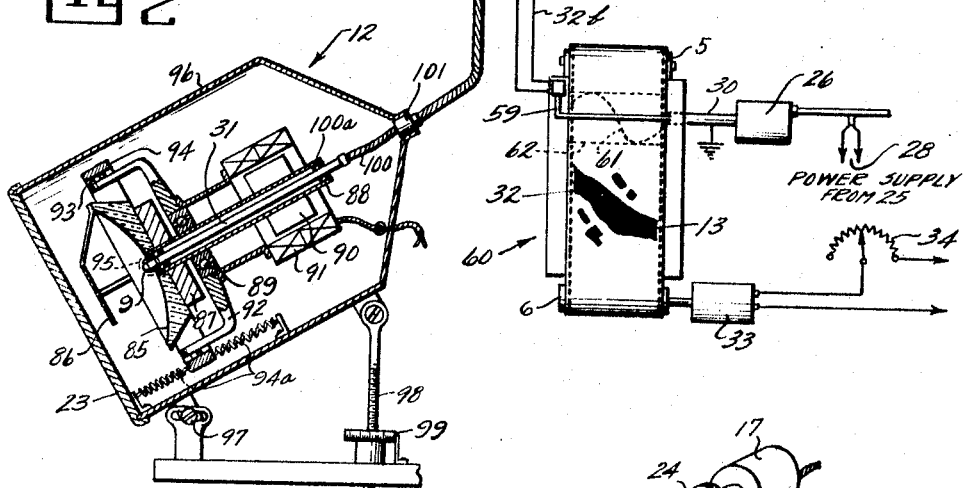
FIG. 2 is a diagrammatic representation of the device, comprising scanner, amplifier and recorder. The scanner is shown partly in section.
Figure 4:
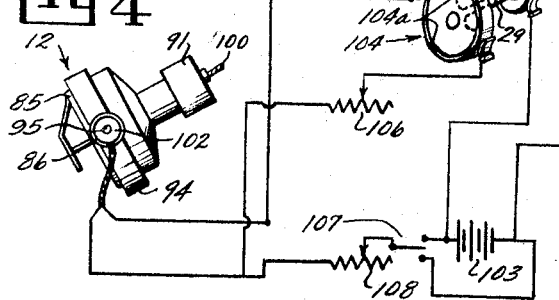
FIG. 4 is a perspective view, partially schematic, of the driving mechanism for the scanning head shown in side elevation.

In FIGS. 2 and 4, the scanning head 12 comprises a housing 96 which contains a desired optical system, such as, for example, a system known as the Cassegranian system. The latter includes an infra-red transparent cover 23. The cover 23 may be made of silver chloride or rock salt, both of which are infra-red transparent. It may be a corrector lens in case the Schmidt optical system is used, which may have special utility for high altitude mapping. The housing 96 is pivoted in a screw slot 97 and carries an adjusting screw mechanism comprising a threaded bolt 98 engaged by a nut 99 serving by its rotation to vary the elevation angle of the optical system. These variations are indicated by a dial shown along the periphery of the nut 99. A primary concave parabolic mirror 85 and a secondary flat or convex mirror 86 are arranged to form a focal plane near the center of the mirror 85. A heat detector 9, which may be a bolometer or a "Thermistor,'" is located in the focal plane on the optical axis, and is non-rotatably mounted within the forward end of a conduit tube 31 that extends axially of the assembly.

The optical system, preferably weighted by a flywheel 87, is mounted on a hollow shaft 88 which turns in a bearing 89. This shaft 88 also carries the rotor 90 of a driving motor 91 that is energized from a usual power line source within the airplane 10. Motor 91 and the bearing 89 are supported in a yoke 92 and held by vertical gimbals 93 in a ring 94, which in turn is supported on horizontal gimbals 95, shown in FIG. 4. The gimbals 95 are mounted in the scanning head housing 96. The detector 9 is connected through the tube 31 and through a bushing 100a by flexible axial leads 100 and through a plug 101 in the housing 96 to an amplifier 58. The leads may also be brought out through the gimbals 93 and 95 in a manner known in the art to minimize precessional effects on the gyroscope, which comprises the mirror 85, the flywheel 87 and the secondary mirror 86.

The horizontal gimbal 95 carries a torque motor 102 (FIG. 4) by which precessional torque is applied to the gyroscopic optical system. The current supply of the torque motor may be, for example, derived from a battery 103 through a commutator 104 and slip rings 105 mounted upon the shaft 27 of a motor 17. The motor 17 is geared to a selsyn generator 25 by gears 24 and 24a and is energized from a usual power line source within the airplane 10. The commutator 104 is provided with insulating segments 104a which serve to give the current fed to the motor 102 the square wave shape shown in FIG 5. The shaft 27 of the motor 17 and upon which the commutator 104 and slip rings 105 are mounted, preferably is tubular, so that conductors 29, shown in dashed line, connect the separate slip rings 105 of opposite polarity from the battery 103, each to a separate segment of the commutator 104.

Figure 5:
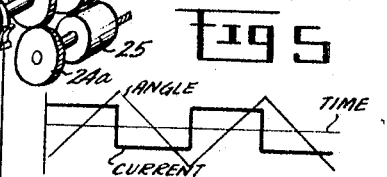
FIG. 5 is a diagram of the electrical wave form of a current used to energize a motor which precesses a gyroscope to oscillate the scanning head.

The value of the current supplied to the torque motor 102 may be adjusted by a potentiometer 106 to give the required amount of precession angle for scanning purposes. The scanning angle in relation to the scanning current is also illustrated in FIG. 5. Practically linear scanning is achieved by this system.

Since the freely gimbaled gyroscopic system will tend to maintain its axial direction, little further stabilization will be necessary. Any further conventional means of stabilization may be employed if necessary or desired. For example, a horizontal drift in the scanning direction may be compensated by a switch 107 shown in FIG. 4, that may be operated manually or automatically and connecting an auxiliary current through a potentiometer 108 from either the positive or the negative terminal of the battery 103. The vertical drift may be compensated by the tension value of a light restraining spring 94a mounted between the ring 94 and the scanning head housing 96. The spring should have a sufficient time constant to avoid action due to short pitch movements of the airplane 10. This means that the spring is very light and does not interfere with the normal stabilizing action of the gyroscope. If, however, continuous drift in the pitching direction should appear due to frictional effects or some other causes, then the spring 94a conveys some increasing value of unidirectional pitching torque to the ring 94. This would cause azimuth drift around the gimbals 93, but can be compensated by adjusting the value of the potentiometer 108 to send additional current through the torque motor 102 to effectively oppose the torque caused by the spring 94a. The operation of the switch 107 may be made dependent on the average azimuth position of the optical system by mounting it on gimbals 93 so that excessive pitch reverses the polarity of current supplied to the motor 102 to compensate for the excessive pitch.

In the drawings, the detector 9 is shown fixedly mounted so that it does not rotate. It, however, may be permitted to rotate with the optical system and the current from it can be picked off by slip ring systems as is well known in the art.

Referring again to FIG. 2, the detector 9 is connected to the amplifier 58 by means of leads in the conduit tube 31 centrally held within the hollow shaft 88, and a flexible conductor 100. The amplifier 58 is connected by leads 32a and 32b to a rodlike loop or riding bar 59 which is hingedly attached to ride a continuous strip of sensitive paper 32 as parts of the recorder 60. The paper strip 32 is preferably "Teledeltos" or other current sensitive paper or other sheet material. The strip 32 has perforated margins and preferably is fed positively from one roll 5 to another roll 6 in a conventional manner. A motor 33, powered from the airplane power source, the speed of which is adjustable by a rheostate 34, furnishes the motive power for travel or traverse of the endless paper strip 32.

The strip 32 passes over a cylinder 62 of insulating material (FIG. 3) which bears a double conductive helix 61 having two complete traverses in opposite directions for each revolution of the cylinder 62 so as to measure one sweep of the scanning head 12 every time the cylinder makes one-half revolution. The cylinder 62 is driven through a shaft 30 by a selsyn motor 26 which derives its power supply 28 from a selsyn generator 25 (FIG. 4) with which it is synchronized in a selsyn system. The selsyn generator 25 is in turn driven through gearing 24 and 24a by the motor 17.

Although synchronization by means of selsyn devices in a selsyn system has been shown as being the most useful arrangement in an airplane where a number of recorders are to be operated simultaneously from the same scanner, it is quite evident that the commutator 104 with slip rings 105 could be mounted on an extension of the shaft 30 of the motor 26 to replace the motor 17 and selsyn generator 25 assembly and assuring thus that the scanning is always synchronous with the recording.

The operation of the device is as follows:

The motor 91 in the optical system scanning head 12 is first energized from the airplane power source, thereby driving the shaft 88 around the firmly mounted conduit tube 31 and rotating the flywheel 87 and the mirrors 85 and 86 at a gyroscopic speed. The motor 17 is next energized from the airplane power source, thereby turning the shaft 27 and driving the slip rings 105 and the commutator 104. The slip rings are connected to opposite poles of the battery 103. The switch 107 is closed and potentiometer 108 is adjusted so that the observed drift of the scanning angle may be compensated. Switch 107 may have to be closed in either of the two optional directions in order to obtain a correct setting. A current of the square wave shape shown in FIG. 5 labeled "current" will have been furnished to the torque motor 102 from the battery 103 by the alternating switching action of the slip rings 105 and the commutator 104. Reversal of the current from positive to negative and vice versa applied to torque motor 102 produces sufficient torque on the gyroscopic optical system to cause precession thereof and consequently a reversal of direction of scanning. Observed heat signals are reflected from the surface of mirror 85 to the inner surface of mirror 86 which is at the focal point of the latter, thereby focusing the signal by reflection from mirror 86 upon the detector 9. The latter generates a minute current of positive polarity which is transmitted through the flexible conductor 100 to the amplifier 58 where it is amplified and applied to the loop 59. The oppositely charged loop 59 and the grounded helix upon opposite sides of the paper strip 32 overcome the dielectric value of the paper and cause its discoloration, as at the black area 13.

The line powered motor 17 has meanwhile been generating a current by rotating the selsyn generator 25 through the gears 24 and 24a. The selsyn-generated current from generator 25, indicated in FIG. 2 as power supply 28, is fed to the selsyn motor 26 which turns the cylinder 62 through the shaft 30. The cylinder 62 is therefore synchronized with the scanning motion of the scanning head 12 by the selsyn system so that the occurrence of signal in any part of the sweep will be identifiable as a discoloration indicated by the black area 13 and as to location in any part of the width of the sensitive paper strip 32. Occurrence of signal in the scanning system causes a current to pass from the rodlike loop or riding bar 59 through the paper strip 32 to the conductive helix 61 which is grounded. A continuous signal will cause the passage of a continuous current. In this manner the sensitive paper 32 is marked and the signal identifies its place of origin as has been explained. The paper 32 has been previously set in continuous motion by the action of power driven motor 33 and its speed regulated by the rheostat 34 to be proportional to the forward progress of the airplane.

In FIG. 2, the electrical sequence of events is as follows:

Power driven motors 17 and 91 are assumed to be running. Selsyn current for operating selsyn motor 26 is being generated and delivered by selysyn generator 25. Alternating current is being made from the output of battery 103 by the rotation of slip rings 105 and commutator 104 which alternately connect the positive and negative poles of battery 103 to the precessing torque motor 102 and therefore to the gimbals 95. Since current for motor 102 and motor 26 is derived from the rotation of motor 17 as ultimate source, it will be seen that the scanning head 12 and the recorder 60 are in synchronism. The potentiometer 106 has been adjusted to give the desired precession angle to the scanning head 12. This operation amounts to applying alternately positive and negative current, as shown in FIG. 5, to the torque motor 102, causing it to exercise precessing torques in alternate directions around the gimbals 95. Such torques, as is well known in the gyroscopic art, will cause the azimuth angle to precess around the gimbals 93, alternately in opposite directions and at angular rates proportional to the precessing torques and therefore dependent on the value of current passed by resistor 106 from the battery 103. This resistor 106 becomes therefore the controlling element for determining the rate of precession and the resulting angle of scan of the scanning head 12 back and forth through the angle O and across the terrain 11 to define the pattern that appears upon the paper strip 32 as the black area 13.

When the potentiometer 108 is connected, for example, by switch 107 to the positive terminal of the battery 103, the current through the torque motor 102 is modified as follows: As the resistor 106 is connected alternately to positive and negative terminals of the battery 103 by the action of the commutator 104, the potentiometer 108 will be in parallel either with the resistor 106 or with the torque motor 102. Therefore the positive current flowing from resistor 106 to the torque motor is increased while the negative current (when the potentiometer 108 is in parallel with the battery 103) is decreased by the shunting action of the potentiometer 108. The net result is that the amount of precession angle is increased in one direction and reduced in the other, thus correcting for continuous drift. When the switch 107 connects the potentiometer 108 to the negative terminal of the battery 103, the action is reversed; the positive current through the torque motor is reduced and the negative current is increased. This action results in correction of the drift in the opposite direction.

It is within the scope of the invention to substitute for the heat sensitive detector 9, a photocell of varying-conductivity type or of the autogenerating type which is sensitive to visible light; or to substitute an ultra-violet sensitive photocell of the kind having a surface known commercially as S-4.

It is to be understood that the rate of advance of the strip 32 should be set with reference to the rate of advance of the airplane and to the horizontal scale of the maplike presentation of recorder 60. This setting can be precalculated, knowing the range of observation (from the scanner to the points observed), the rate of scanning, the scanning angle and the speed of flight. Thus the operator can consult either a table or a chart for the correct strip speed to assure equal scales of the Cartesian coordinates of the maplike presentation.

It is to be understood that the device is not placed in actuation until the airplane approaches the area to be mapped. Then manual activation of the motors 17 and 33 is performed, i.e. their circuits are closed. Then the airplane flies a straight and level course over the area to be mapped, following which the circuits of the above mentioned motors are again de-energized.

The invention claimed is:

1. In an automatic mapper, as oscillatable scanning head, an amplifier and a recorder; said scanning head comprising an optical system and a gyroscopic system combined, a common shaft upon which the two systems are mounted, a motor arranged to drive said shaft, said optical system including a concave mirror, a secondary mirror carried by the concave mirror and arranged to receive signal reflected by the concave mirror, a detector arranged to receive signal reflected by said secondary mirror, an amplifier for signal received from said detector and a recorder for signal received from said amplifier and means for driving said recorder in synchronism with the oscillations of said oscillatable scanning head.

2. In an automatic mapper, an oscillatable scanning head, an amplifier arranged to amplify signal received from said scanning head, a recorder adapted to record amplified signal in synchronism with the oscillating motion of said scanning head, means for driving said recorder in synchronism with said scanning head means for stabilizing said oscillating motion, said means comprising a combined optical and gyroscope system mounted upon and driven through a common shaft, and means for precessing said combined system at regular intervals to confer an oscillating motion on said scanning head.

3. In combination in an automatic mapper, a scanning head comprising a housing, a gimbaled optical system in said housing, a flywheel, a shaft upon which said optical system and flywheel are mounted, a motor for driving said shaft to rotate said flywheel and optical system together at gyroscopic speed, a motor adapted to precess said combined flywheel and optical system at short intervals to produce oscillation thereof, means for generating a square wave alternating current for said motor, a recorder operated synchronously with said generating means, a detector in said scanning head adapted to receive signal from said optical system, an amplifier for amplifying said signal and means for applying said amplified signal to said recorder.

4. A mapping device for a linearly moving vehicle including means for scanning substantially at right angles to the path of the vehicle comprising a mechanically propelled gimbaled optical system, a gyroscopic system linearly associated with said optical system to stabilize the latter, a detector adapted to receive signal picked up by said optical system, an amplifier, an electric motor for precessing the combined optical and gyroscopic systems, electrical circuits for achieving volume control of signal from said detector, control of the scanning rate and for correcting drift, a recorder of the continuously operated type adapted to receive and record signal from the volume controlling means, scanning-rate-controlling and drift correcting means whereby to assure that spatial displacement of the vehicle is represented in the record produced by the recorder in a substantially proportional manner.

5. In combination, an infra-red sensitive radiation scanning system including an oscillating scanning head which comprises an optical system and a radiation detector for detecting and transmitting a signal, means including a gyroscopic element for producing scanning movements of said scanning head, a torque motor mounted on said scanning head to produce precessional movements in said gyroscopic element and thereby induce scanning movement, a recorder for signals transmitted by said detector and optical system said recorder including a rotatable element for producing linear scanning of the recorder means for driving said rotatable element, and means for furnishing square wave current to said torque motor and alternating current synchronized with said square wave current to said rotatable-element-driving means whereby to synchronize the recording of signal by said recorder with the scanning motion of said scanning head.

6. The combination set forth in claim 5 including a potentiometer arranged to regulate the current supply for said torque motor to adjust the amount of precession of said gyroscopic element.

References Cited
UNITED STATES PATENTS

| | | | |
|---|---|---|---|
| 2,388,105 | 10/1945 | Wilson | 234—1.5 |
| 2,176,013 | 10/1939 | Pineo | 234—1.5 |
| 2,404,064 | 7/1946 | Heigl | 250—43 |
| 2,170,435 | 8/1939 | Sweeney | 73—51 |
| 2,314,800 | 3/1943 | Pineo | 250—43 |
| 2,227,109 | 12/1940 | Shaukweiler | 178—11 |
| 2,306,272 | 12/1942 | Levy | 178—6.8 |
| 2,419,024 | 4/1947 | Iams | 178—6.6 |
| 2,403,562 | 7/1946 | Smith | 178—5 |
| 2,369,622 | 2/1945 | Toulon | 250—33.65 |
| 2,410,317 | 10/1946 | Tolson | 343—17 |
| 2,415,679 | 2/1947 | Edwards et al. | 250—33.65 |
| 1,781,799 | 11/1930 | Baird | 343—17 |
| 2,403,066 | 7/1946 | Evans | 178—6.8 |
| 2,437,251 | 3/1948 | Frische | 343—117 |

HOWARD W. BRITTON, *Primary Examiner.*

R. MURRAY, *Assistant Examiner.*

U.S. Cl. X.R.

250—65, 71.5